United States Patent [19]

Sakurai

[11] Patent Number: 4,942,659
[45] Date of Patent: Jul. 24, 1990

[54] WHEEL MOUNTING APPARATUS FOR AUTOMOBILES

[75] Inventor: Hiromi Sakurai, Nagoya, Japan

[73] Assignee: Mitsubishi Jidosha Kogyo Kabushiki Kaisha, Tokyo, Japan

[21] Appl. No.: 389,310

[22] Filed: Aug. 2, 1989

[30] Foreign Application Priority Data

Aug. 19, 1988 [JP] Japan .................. 63-204790
Aug. 19, 1988 [JP] Japan .................. 63-204791

[51] Int. Cl.⁵ .............................................. B23P 21/00
[52] U.S. Cl. ........................................ 29/705; 29/712; 29/714; 29/771; 29/783; 29/791; 29/809
[58] Field of Search ............... 29/705, 711, 712, 714, 29/771, 783, 791, 809

[56] References Cited

FOREIGN PATENT DOCUMENTS

62-120281  6/1987  Japan ..................... 29/705

*Primary Examiner*—Timothy V. Eley
*Attorney, Agent, or Firm*—Abelman Frayne Rezac & Schwab

[57] ABSTRACT

An automatic wheel mounting apparatus provided with a robot for positioning a wheel on a hub of an automobile and for tightening nuts onto hub studs, which has a lifting device for lifting the hub in a direction to cancel the camber angle, a head positioned by the robot, and a measurement and positioning unit disposed on the head and having a hub center measuring device, a hub stud positioning device, and a hub inclination measuring device, whereby an inclination condition of the hub surface due to steering angle or the like is detected by the hub inclination measuring device to cause the measurement and positioning unit to confront the hub, the hub center is measured by the hub center measuring device to align the center of the measurement and positioning unit with the hub center, and then the hub is rotated by the hub stud positioning device to position the hub studs at predetermined positions.

20 Claims, 6 Drawing Sheets

WHEEL MOUNTING APPARATUS FOR AUTOMOBILES

BACKGROUND OF THE INVENTION

This invention relates to an apparatus for automatically mounting wheels equipped with tires in an assembly process of automobiles.

Automation of the assembly process of automobiles requires an apparatus for automatically mounting wheels on hubs of automobiles.

An automatic wheel mounting apparatus comprises a robot for positioning the wheels on the hubs and applying and tightening nuts, a nut supplying device for supplying the robot with nuts, and, a device for supplying tires. In this case, when the robot positions a wheel onto a hub and threads the nuts onto the hub studs, the hub must be oriented in a predetermined position, and the position of the hub studs must be aligned with the position of blot holes in the wheel.

In an assembly line, in general, the automobile is carried on a shuttle and, at a wheel mounting pit, a lower arm of thee automobile suspension is pushed up by a lifting device to position the hub. However, even if pushed up by a fixed amount, although the camber angle can be cancelled, the hub is not always oriented in the same position. The position varies with vehicles type, and especially with the steering angle. As a result, the robot may sometimes fine it to be impossible to mount a wheel on a hub.

Furthermore, the rotational position of the hub studs varies with the rotational position of the hub. The positioning mechanism of the robot for handling the wheel and the nuts thus becomes complicated in order to align the rotational position of the wheel and nuts with the rotational position of the hub studs. In addition, a sensor is required for detecting the position of the hub stubs.

An automatic wheel mounting apparatus is described in Japanese Patent Publication Laid-Open No. 59-227505/1984. However, this apparatus is complex in structure and involves a large number of steps for the mounting operation. In this apparatus, the angle position of the hub is set against the studs by pushing an inclined regulating plate. This requires a large pushing force, is slow in setting speed, and it is difficult to achieve precision setting. Furthermore, wheel mounting is difficult when the hub is inclined due to a large steering angle.

SUMMARY OF THE INVENTION

It is a primary object of the present invention to provide an automatic wheel mounting apparatus, which is simple in structure and is able to mount a wheel precisely onto a previously positioned hub.

In accordance with the present invention, and automatic wheel mounting apparatus comprises a lifting device for lifting a hub in a direction to cancel the camber angle, a head positioned by a robot, and a measurement and positioning unit disposed on the head and having a hub center measuring device, a hub stud positioning device, and, a hub inclination measuring device. The hub center measuring device comprises vertically movable first and second feeler members which contact upper and lower surfaces of the circular outer peripheral surface of the hub, a laterally movable third feeler member which contacts a side surface of the outer peripheral surface of the hub, and measuring devices for measuring the exact position of the respective feeler members. The hub stud positioning device comprises a hub stud positioning plate having a projection which contacts the hub studs, and an actuator for rotating the hub stud positioning plate through an angle greater than the pitch interval between the hub studs. The hub inclination measuring device has a pair of laterally disposed measuring devices for measuring the distance to the surface of the hub.

For a hub with an even number of hub studs, the feeler members can contact the outer peripheral surface of the hub studs.

If the hub center measuring device contacts the circular outer peripheral surface of the hub and also contacts the outer peripheral surface of the hub studs, then the wheel mounting apparatus can accommodate hubs having an odd or an even number of studs.

In the present invention, the angular orientation of the hub related to the steering angle is detected by the laternally dispoesed measuring devices. If the hub is inclined, then the head is moved so that the hub center measuring device, and the hub stud positioning device are brought into position with respect to the hub.

In the hub center measuring device, a first and a second feeler members are caused to contact a vertical diameter of the hub. The vertical dislocation of the hub center relative to the center of the robot, and, the diameter of the circular outer peripheral surface of the hub is then determined from the obtained measurements. Then, a third feeler member is caused to contact a lateral diameter of the hub. The lateral dislocation of the hub center relative to the center of the robot is then determined from the obtained measurements.

Alternatively, if the hub has an even number of hub studs, the feeler members can contact the hub studs to measure the position of the hub center.

If the centers are not in line, the head of the robot is moved to position the rotational center of the hub stud positioning plate in alignment with the rotational axis of the hub. When the hub stud positioning plate is rotated by the actuator, the positioning projection contacts the hub studs, and then the hub is rotated to bring the hub to a predetermined angular position, and thereby positioning the hub studs at a predetermined angular position.

Then, a wheel which has been correctly oriented by the robot is set onto the hub, and the nuts are driven onto the hub studs to mount the wheel.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE INVENTION

Figure 6:
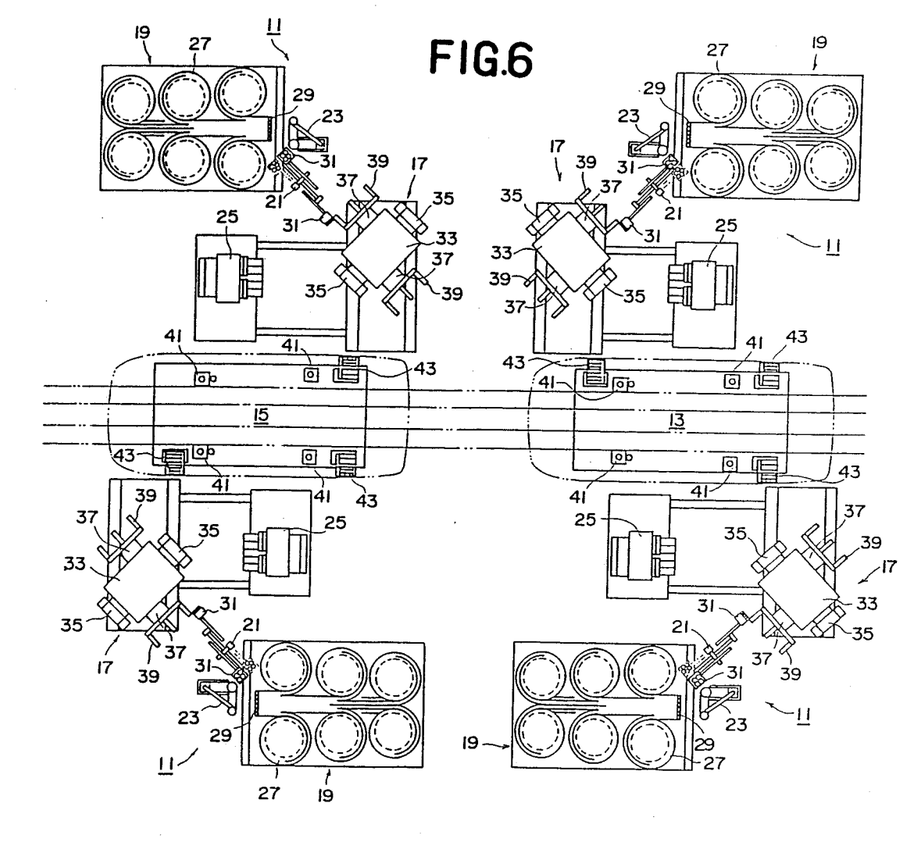
FIG. 6 is a schematic plan view showing an entire automatic wheel mounting line.

An entire automatic wheel mounting line will first be described with reference to FIG. 6 which shows four sets of automatic wheel mounting apparatus 11 for mounting the front and rear wheels of an automobile. These four sets of automatic wheel mounting apparatus 11 are disposed so that front right and rear left wheels are mounted at a first pit 13 of the assembly line and front left and rear right wheels are mounted at a second pit 15 following the first pit 13. The diagonally located are simultaneously mounted so as to eliminate problems caused by concurrent movement of right and left hubs when mounting the wheels.

Each of the automatic wheel mounting apparatus 11 has a wheel mounting robot 17, a nut feeder 19, a nut loader 21, a nut robot 23, and a wheel supplying device 25. The nut feeder 19 has six nut storage units 27 for storing six different types of nuts used in this assembly line, and supplies these nuts to specified delivery positions 29. The nut loader 21 supplies the nuts required for mounting a wheel to the wheel mounting robot 17, and has a receiver 31 having a plurality of nut supporting units located at the same relative positions as the hub studs. The receiver 31 includes a four nut supporting unit, and a five nut supporting unit, which are selected according to the type of vehicle. The nut robot 23 picks up nuts at the delivery position 29 of the nut feeder 19, and places a required number of nuts on the receiver 31 of the nut loader 21. The wheel supplying device 25 turns a wheel carried by a conveyer (not shown) toward a predetermined direction and supplies it to the wheel mounting robot 17.

The wheel mounting robot 17 has a head 33, which is movable in a horizontal plane and also in a vertical direction, and is rotatable in the horizontal plane. The head is provided with a measurement and positioning unit 35 and a wheel mounting unit 37. The measurements and positioning unit 35 and the wheel mounting unit 37, as in the case of the receiver 31, include 4-nut and 5-nut types, which respectively are located on opposite sides of the head 33. The measurement and positioning unit 35 detects the hub center in order to center the wheel mounting robot 17, and turns and positions the hub so that the hub studs are at predetermined positions. The wheel mounting unit 37 has a plurality of nut runners (not shown) at its center which have the same relative positions as the hub studs, and has tire gripping claws 39 on its outer periphery.

When wheels are mounted using the above described apparatus, the body of the automobile is positioned by a positioning device 41 at a predetermined position, and the hub is positioned so that the camber angle is cancelled by pushing up the lower arm of the suspension by a lifting device 43. Then, the wheel mounting robot 17 receives nuts onto the nut runners of its wheel mounting unit 37, and turns correctly towards the wheel supplying device 25 to grip a tire by the tire gripping claws 39. The measurement and positioning unit 35 is then turned correctly towards the hub to center the tire mounting robot 17, and to position the hub studs at a predetermined rotational angle. The head 33 is then turned by 90° to cause the wheel mounting unit 37 to face the hub, and the wheel is set on the hub and the nuts are threaded onto the hub studs to mount the wheel.

The measurement and positioning unit 35 will now be described in detail. As described above, the measurement and positioning unit 35 includes the 4-nut and 5-nut types. The 5-nut type unit will now be described.

The measurement and positioning unit 35, as shown in FIGS. 1 to 5, has a supporting frame 45 having a box-formed cross sectional structure. The supporting frame 45 is disposed on a base plate 47 and is supported slidably in a longitudinal direction on the base plate 47 through a linear guide 49, and is normally urged towards the front by a spring 51 (FIG. 4) and positioned by contacting against an abutment 53 which is fixed at the front of the base plate 47. If an excessive force is accidentally applied to the supporting frame 45, the frame 45 dislocates against the force of the spring 51. Then, the dislocation is detected by a limit switch 55 (FIG. 3) to immediately stop the wheel mounting robot 17.

The measurement and positioning unit 35 is provided with a hub center measuring device which measures the rotational center of the hub H, a hub stud positioning device which rotate the hub and determines the rotational position of the hub studs, and an inclination measuring device for measuring the angular orientation of the surface of the hub H.

Figure 5:
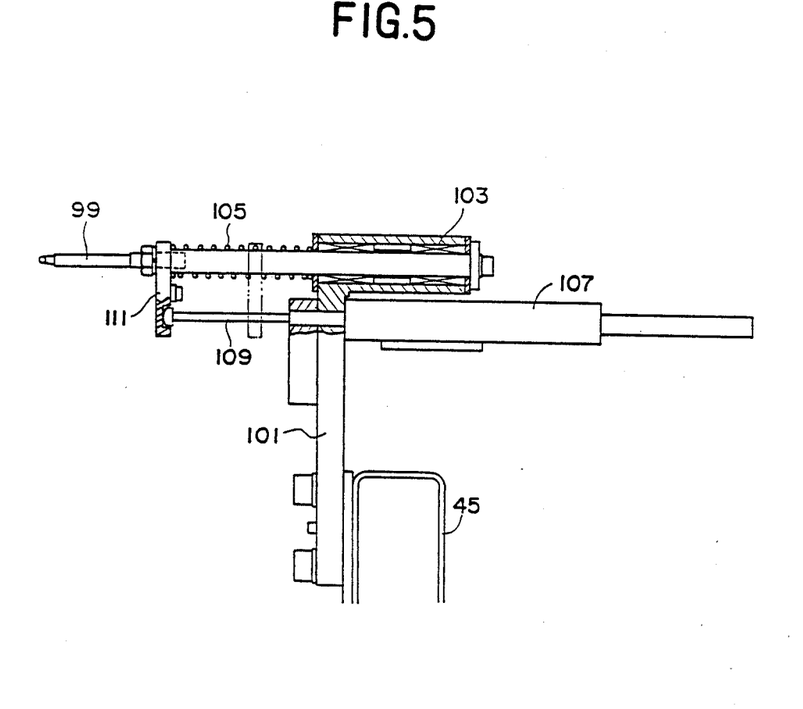
FIG. 5 is a schematic enlarged view showing a feeler member.

The inclination measuring device for the hub H will first be described. In front of the supporting frames 45 and protruding to the front (FIG. 3) is a pair of laterally spaced feeler memebers 99, for measuring the angular orientation of the hub H due to the steering angle. As shown in FIG. 5, each feeler member 99 is supported longitudinally on a bracket 101 fixed to the supporting frame 45 through a linear bushing 103, and is urged towards the front by a spring 105. Additionally, the bracket 101 mounts a linear length measuring device 107 adjacent to the linear bushing 103, the device 107 having a detection rod 109 which engages with a connecting plate 111 fixed to the measurement piece 99.

Next, the hub center measuring device will be described. In a space at the center of the supporting frame 45, and at the front of the supporting frame 45 are mounted upper, lower, and left slide tables 57, 59, and 81 so as to surround the space. The upper and lower slide tables 57 and 59 are respectively mounted with sliders 63 and 65 slidably in the vertical direction, and the left slider 61 is mounted with a slider 67 slidably in the horizontal direction. These sliders 63, 65, and 67 are slidably reciprocated by air cylinders (not shown) incorporated in the individual slide tables 57, 59, and 61.

The sliders 63, 65, and 67 are respectively mounted with measuring blocks 69, 71, and 73, and front ends of the respective measuring blocks 69, 71, and 73 of the center side of the supporting frame 45 are mounted with measurement pieces 75, 77, and 79 which come in contact against the circular outer peripheral surface of the hub H. The term circular outer peripheral surfaces of the hub H as used herein denotes that circumferential surface which is located in the vicinity of the hub studs and concentric with the rotational center of the wheel, for example, the outer peripheral surface of a brake drum of a vechile equipped with a drum brake.

In front of the supporting frame 45 are provided linear length measuring devices 81, 83, and 85 responsive to the sliders 63, 65, and 67, respectively. Detecting rods 87, 89, and 91 are conected respectively to brackets 93, 95, and 97 which are protrudingly provided on the side of the individual measuring blocks 69, 71, and 73.

Figure 1:
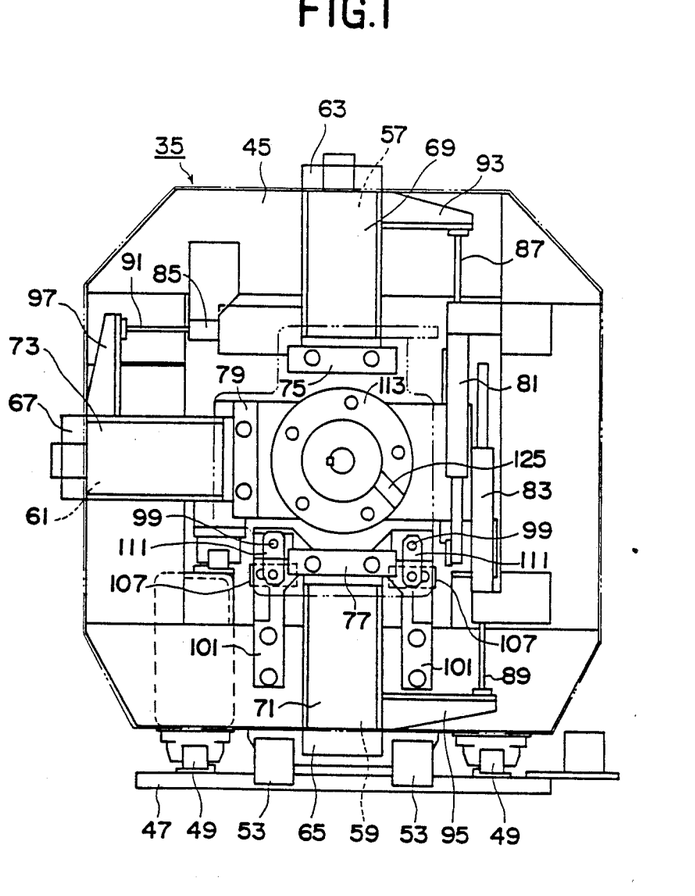
FIG. 1 is a schematic front view showing an apparatus according to the present invention.
Figure 2:
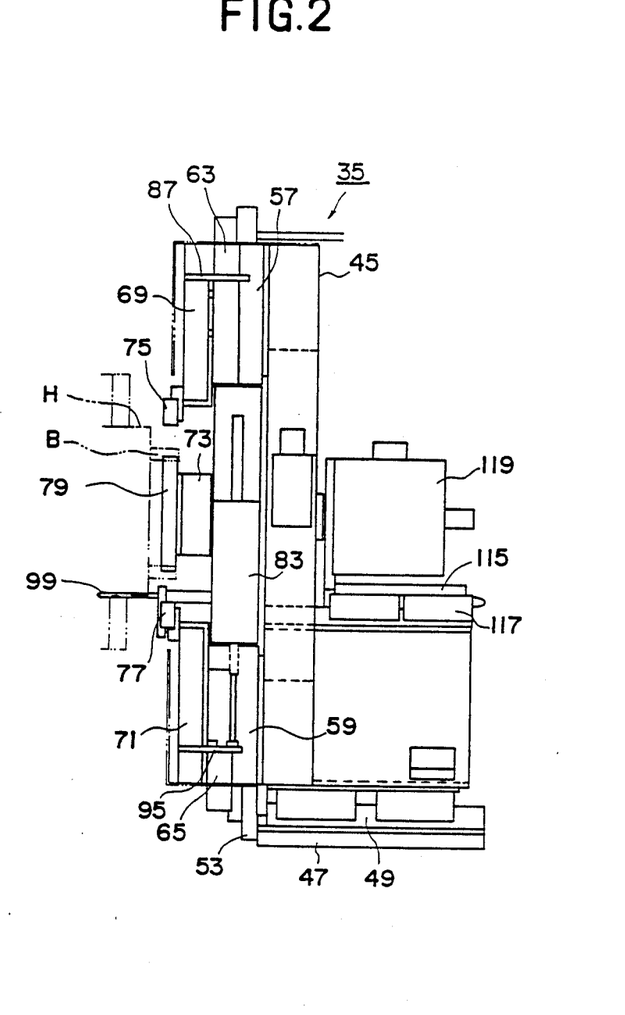
FIG. 2 is a schematic side view of the apparatus.
Figure 3:
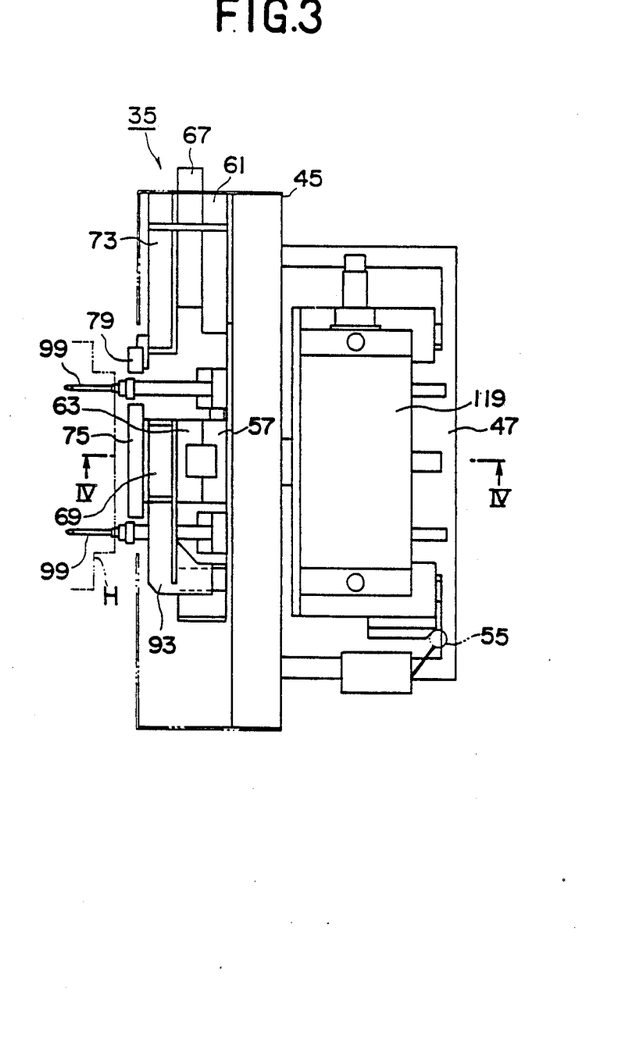
FIG. 3 is a schematic plan view of the apparatus.
Figure 4:
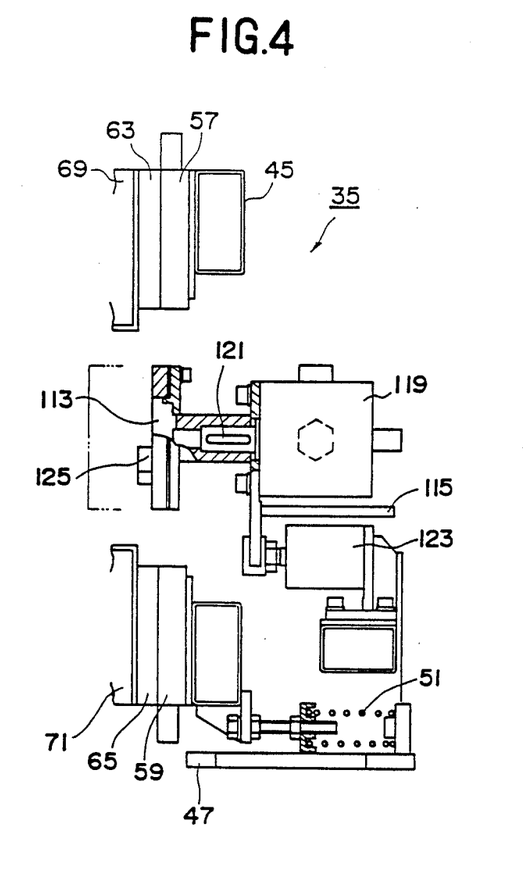
FIG. 4 is a schematic cross sectional view taken along line IV—IV in FIG. 3.

As a hub stud positioning device which actually rotationally position hub studs B, there is disposed a hub stud positioning plate 113, facing the front, at the center of the supporting frame 45. As shown in FIG. 2, on the rear of the supporting frame 45, a receiver 115 is supported slidably in the longitudinal direction by a linear guide 117, and an actuator 119 is provided on the receiver 115. Referring to FIG. 4, a drive shaft 121 of the actuator 119 is located on the center line of the hub stud positioning unit 35, and to its front end is attached the hub stud positioning plate 113. The receiver 115 is connected with an air cylinder 123, which operates to move the receiver 115 in the longitudinal direction (right/left direction in FIG. 4).

The hub stud positioning plate 113 is provided on its front surface with a positioning projection 125 which is able to contact against the outer peripheral surface of the hub stud B. The actuator 119 rotates the hub stud positioning plare 113 by a predetermined angle around the center of the measurement and positioning unit 35 so that the positioning projection 125 moves over a predetermined angular range which is greater than the pitch interval of the hub studs B.

The operation of the measurement and positioning unit 35 will now be described. As described above, prior to the mounting a wheel, the measurement and positioning unit 35 is caused to face the hub H, so that the unit correctly confronts the surface of the hub H. As the measurement and positioning unit 35 is brought closer to the hub H, the feeler members 99 of the inclination measuring device first come in contact against the surface of the hub H. If the steering angle is zero and the surface of the hub H is parallel to the running direction of the automobile (the direction of the assembly line), the respective feeler members 99 are pushed in by the same amounts. If the surface of the hub H is inclined at an angle to the running direction, there occurs a difference in the amount of dislocation between the respective feeler members 99, resulting in a difference in output between the pair of linear length measuring devices 107. In such a case, the head 33 is turned until the measurement and positioning unit 35 correctly confronts the surface of the hub H in parallelism therewith, thereby improving the precision of the subsequent hub center measurement.

Next, the rotational center of the hub H is determined. To do this, the upper and lower sliders 63 and 65 are brought closer to each other to cause their measurement pieces 75 and 77 to come in contact against the circular outer peripheral surface of the hub H. From the outputs of the linear length measuring devices 81 and 83, dislocation between the vertical center of the measurement and positioning unit 35 and the center of the hub H and the diameter of the circular outer peripheral surface of the hub H are determined. Then, after the upper and lower sliders 63 and 65 are withdrawn, the left slider is moved forward until its measurement piece 79 comes in contact against the circular outer peripheral surface of the hub H, and from the output of the linear length measuring device 85 at this position and the previoulsy determine diameter of the hub H, dislocation between the horizontal center of the measurement and positioning unit 35 and the center of the hub H is determined. Thus, the rotational center of the hub H is determined and, based on the results, the head 33 is moved to align the measurement and positioning unit 35 with the center of the hub H.

Then, the hub H is turned to position the hub stud B to a predetermined angular position. Specifically, the air cylinder 123 is operated to move the hub stud positioning plate 11 forward to protrude the positioning projection 125 to the position where the projection engages with the hub stud B, and the actuator 119 is operated to rotate the hub stud positioning plate 113. In the course of the rotation of the hub stud positioning plate 113, the positioning projection 125 comes in contact against the outer peripheral surface of the hub stud B regardless of the position of the hub stud B, and as the hub stud positioning plate 113 further rotates, the positioning projection 125 engages the hub stud B to rotate the hub H, thereby positioning the hub stud B at the predetermined angular position. When the hub stud positioning plate 113 is moved forward, if by chance the hub stud B is in line with the positioning projection 125, and the positioning projection 125 rides on the end surface of the hub stud B, the positioning projection 125 is released by subsequent rotation of the hub stud positioning plate 113 and comes in contact with the outer peripheral surface of the neighboring hub stud B. Thus, this is not a problem.

At this moment, as described above, since the center of the measurement and positioning unit 35 is aligned with the center of the hub H, the hub stud positioning plate 113 can be rotated to a predetermined angular position to position the hub stud B at the predetermined angular position.

Thus, the hub stud B is positioned at a predetermined position, which enables subsequent mounting of the wheel by the wheel mounting unit 37 and attachment of nuts onto the hub studs.

With above described 5-nut type of measurement and positioning uhit 35, the measurement pieces 75, 77, and 79 are caused to contact against the circular outer peripheral surface of the hub H when determining the center of the hub. However, for the case with an even number of hub studs, it is also possible to determine the hub center by causing the measurement pieces 75, 77, and 79 to contact against the hub studs. Thus, the 4-nut type of measurement and positioning unit 35 in this embodiment is arranged to cause the measurement pieces 75, 77, and 79 to contact against the outer peripheral surface of the hub studs. In this case, the four hub studs are disposed at 90° intervals, the mid-point of the upper and lower measurement pieces 75 and 77 is at the same height as the rotational center of the hub H. Therefore, the hub center can be measured employing the hub studs as a substitute for the circular outer peripheral surface of the hub H.

As described above, with the present invention, the inclination of the surface of the hub H due to the steering angle or the like is detected by the linear length measuring devices 107, and if inclined, the head is turned to cause the measurement and positioning unit 35 to correctly confront the surface of the hub H. The measurement pieces 75, 77, and 79 are caused to contact from three directions, vertically and laterally, to exactly determine the center of the hub H, and if the center is incorrectly positioned, the center of the measurement and positioning unit 35 is aligned with the center of the hub H. Then, the actuator 119 is operated to turn the hub and set the hubs studs B at predetermined rotational positions. The measurement pieces 75, 77, and 79 are disposed at three positions in the vertical and horizontal directions, and one position is open. Disk brake calipers or other devices can be disposed at this open position without interference.

I claim:

1. An automatic wheel mounting apparatus for an automobile, and which includes a robot for positioning a wheel on a hub of the automobile and for tightening nuts onto hub studs, each hub having a separate camber angle associated therewith, said apparatus comprising:

a lifting device for lifting said hub in a direction to cancel its camber angle, a head positioned by said robot, and a measurement and positioning unit disposed on said head and having a hub center measuring device, a hub stud positioning device, and a hub inclination measuring device;

said hub center measuring device comprising vertically movable first and second measurement pieces for contact with the upper and lower parts of a circular outer peripheral surface of said hub, a laterally movable third measurement piece for contact with a side of said outer peripheral surface of said hub, and length measuring devices for measuring the amount of dislocation of said individual measurement pieces;

said hub stud positioning device comprising a hub stud positioning plate having a positioning projection for contact against an outer peripheral surface of said hub studs fixed to said hub, and an actuator for rotating said hub stud positioning plate to a predetermined angular position over an angular range greater than the pitch interval between said hub studs; and said hub inclination measuring device having a pair of linear length measuring devices disposed laterally for measuring distance to the surface of said hub.

2. The automatic wheel mounting apparatus as claimed in claim 1, wherein said head is provided with a supporting frame having a space formed at its center, surrounding said space vertically movable first and second sliders disposed above and beneath said space and attached to said supporting frame and a laterally movable third slider disposed on a side of said space and attached to said supporting frame, front ends of said sliders supporting said first, second, and third measurement pieces each having contact surfaces perpendicular to the moving directions of said individual sliders, said length measuring devices each being attached to said supporting frame parallelly to the moving directions of said individual sliders, detection rods connected to move with said sliders, and in which said hub stud positioning plate is disposed facing the front at the center of said space of said supporting frame.

3. The automatic wheel mounting apparatus as claimed in claim 1, wherein said hub stud positioning plate is mounted on a drive shaft of said actuator, and said actuator is movable in the longitudinal direction.

4. The automatic wheel mounting apparatus as claimed in claim 1, said hub inclination measuring device is supported protrudingly in front of said hub center measuring device and said hub stud positioning device and movably in the longitudinal direction and has measurement pieces urged by springs towards the front, and said detection rods of said linear length measuring devices are connected to said measurement pieces.

5. The automatic wheel mounting apparatus as claimed in claim 1, wherein said head is rotatable around a vertical axis, and a wheel mounting unit having nut runners and tire gripping claws is disposed on said head on the same rotational plane as that of said measurement and positioning unit and at an angular position different from that of said measurement and positioning unit.

6. The automatic wheel mounting apparatus as claimed in claim 1, wherein four sets of said automatic wheel mounting apparatus are provided corresponding with four tires of front and rear wheels of the automobile, and said four automatic wheel mounting apparatus are disposed so that front right and rear left tires are mounted at one pit and front left and rear tires are mounted at another pit.

7. An automatic wheel mounting apparatus for an automobile, and which includes robot for positioning a wheel on a hub having an even number of circumferentially disposed hub studs and for tightening nuts onto said studs, each hub having a separate camber angle associated therewith, said apparatus comprising:

a lifting device for lifting said hub in a direction to cancel its camber angle, a head positioned by said robot, and a measurement and positioning unit disposed on said head and having a hub center measuring device, a hub stud positioning device, and a hub inclination measuring device;

said hub center measuring device comprising vertically movable first and second measurement pieces for contact with an outer peripheral surface of said hub studs positioned respectively at the uppermost and lowermost positions, a laterally moveable third measurement piece for contact with said outer peripheral surface of said hub stud positioned at the lateral extremity, and length measuring devices for measuring the amount of dislocation of said individual measurement pieces;

said hub stud positioning device comprising a hub stud positioning plate having a positioning projection for contact against an outer peripheral surface of said hub studs fixed to said hub, and an actuator for rotating said hub stud positioning plate to a predetermined angular position over an angular range greater than the pitch interval between said hub studs; and said hub inclination measuring device having a pair of linear length measuring devices disposed laterally for measuring distance to the surface of said hub.

8. The automatic wheel mounting apparatus as claimed in claim 2, wherein said head is provided with a supporting frame having a space formed at its center, surrounding said space vertically movable first and second sliders disposed above and beneath said space and attached to said supporting frame, and a laterally movable third slider disposed on a side of said space and attached to said supporting frame, front ends of said sliders supporting said first, second, and third measurement pieces each having contact surfaces perpendicular to the moving directions of said individual silders, said length measuring devices each being attached to said supporting frame parallelly to the moving directions of said individual sliders, detection rods connected to move with said sliders, and in which said hub stud positioning plate is disposed facing the front at the center of said space of said supporting frame.

9. The automatic wheel mounting apparatus as claimed in claim 7, wherein said hub stud positioning plate is mounted on a drive shaft of said actuator, and said actuator is movable in the longitudinal direction.

10. The automatic wheel mounting apparatus as claimed in claim 7, said hub inclination measuring device is supported protrudingly in front of said hub center measuring device and said hub stud positioning device and movably in the longitudinal direction and has measurement pieces urged by springs towards the front, and said detection rods of said linear length measuring devices are connected to said measurement pieces.

11. The automatic wheel mounting apparatus as claimed in claim 7, wherein said head is rotatable around a vertical axis, and a wheel mounting unit having nut runners and tire gripping claws is disposed on said head on the same rotational plane as that of said measurement and positioning unit and at an angular position different from that of said measurement and positioning unit.

12. The automatic mounting apparatus as claimed in claim 7, wherein four sets of said automatic wheel mounting apparatus are provided corresponding with four tires of front and rear wheels of the automobile, and said four automatic wheel mounting apparatus are disposed so that front right and rear left tires are mounted at one pit and front left and rear right tires are mounted at another pit.

13. An automatic wheel mounting apparatus for an automobile, and which includes a robot for positioning a wheel on a hub of the automobile and for tightening nuts onto hub studs, each hub having a separate camber angle associated therewith, said apparatus comprising:
 a lifting device for lifting said hub in a direction to cancel its camber angle, a head positioned by said robot, and first and second measurement and positioning units disposed on said head and each having a hub center measuring device, a hub stud positioning device, and a hub inclination measuring device;
 said hub center measuring device of said first measurement and positioning unit comprising vertically movable first and second measurement pieces for contact with the upper and lower parts of a circular outer peripheral surface of said hub, a laterally movable third measurement piece for contact with a side of a circular outer peripheral surface of said hub, and length measuring devices for measuring the amount of dislocation of said individual measurement pieces;
 said hub center measuring device of said second measurement and positioning unit, for a hub having an even number of hub studs disposed circumferentially at equal intervals, comprising vertically movable first and second measurement pieces for contact with the outer peripheral surface of said hub studs positioned respectively at the uppermost and lowermost positions, a laterally movable third measurement piece for contact with the outer peripheral surface of said hub stud positioned at the lateral extremity, and length measuring devices for measuring devices for measuring the amount of dislocation of said individual measurement pieces;
 said hub stud positioning device comprising a hub stud positioning plate having a positioning projection for contact against the outer peripheral surface of hub studs fixed to said hub, and an actuator for rotating said hub stud positioning plate to a predetermined angular position over an angular range greater than the pitch interval between said hub studs; and
 said hub inclination measuring device having a pair of linear length measuring devices disposed laterally for measuring distance to the surface of said hub.

14. The automatic wheel mounting apparatus as claimed in claim 13, wherein said head is provided with a supporting frame having a space formed at its center, surrounding said space vertically movable first and second sliders disposed above and beneath said space and attached to said supporting frame and a laterally movable third slider disposed on a side of said space and attached to said supporting frame, front ends of said sliders supporting said first, second, and third measurement pieces each having contact surfaces perpendicular to the moving directions of said individual sliders, said length measuring devices each being attached to said supporting frame parallelly to the moving directions of said individual sliders, detection rods connected to move with said sliders, and in which said hub stud positioning plate is disposed facing the front at the center of said space of said supporting frame.

15. The automatic wheel mounting apparatus as claimed in claim 13, wherein said hub stud positioning plate is mounted on a drive shaft of said actuator, and said actuator is movable in the longitudinal direction.

16. The automatic wheel mounting apparatus as claimed in claim 13, said hub inclination measuring device is supported protrudingly in front of said hub center measuring device and said hub stud positioning device and movably in the longitudinal direction and has measurement pieces urged by springs toward the front, and said detection rods of said linear length measuring devices are connected to said measurement pieces.

17. The automatic wheel mounting apparatus as claimed in claim 13, wherein said head is rotatable around a vertical axis, and a wheel mounting unit having nut runners and tire gripping claws is disposed on said head on the same rotational plane as that of said measurement and positioning unit and at an angular position different from that of said measurement and positioning unit.

18. The automatic wheel mounting apparatus as claimed in claim 17, wherein said head is near rectangular as viewed from the front, and said first and second measurement and positioning units are disposed respectively on the opposite sides of said head.

19. The automatic wheel mounting apparatus as claimed in claim 13, wherein four sets of said automatic wheel mounting apparatus are provided corresponding with four tires of front and rear wheels of the automobile, and said four automatic wheel mounting apparatus are disposed so that front right and rear left tires are mounted at one pit and front left and rear right tires are mounted at another pit.

20. An automatic apparatus for mounting automobile wheels onto wheel hubs, comprising:
 first means for determining the exact positioning of a wheel hub of said automobile and for adjusting the position of said apparatus to align an axis of said apparatus with a longitudinal axis of said hub;
 second means for rotating studs of said hub to a specific angular position;
 third means for determining the angular orientation of the hub relative to a vertical lane bisecting said automobile, and for adjusting the position of said apparatus into parallelism with said hub;
 fourth means for positioning a wheel on said studs; and
 fifth means for applying nuts to said studs.

* * * * *